US008494698B2

(12) United States Patent
Murata et al.

(10) Patent No.: US 8,494,698 B2
(45) Date of Patent: Jul. 23, 2013

(54) HYBRID SYSTEM CONTROL APPARATUS AND HYBRID SYSTEM CONTROL METHOD

(75) Inventors: Hiroki Murata, Gotenba (JP); Isao Matsumoto, Suntou-gun (JP); Naofumi Magarida, Susono (JP); Akira Yamashita, Susono (JP); Hiroyuki Haga, Susono (JP); Takenori Saoda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 468 days.

(21) Appl. No.: 12/451,344

(22) PCT Filed: Oct. 2, 2008

(86) PCT No.: PCT/IB2008/002596
§ 371 (c)(1),
(2), (4) Date: Nov. 9, 2009

(87) PCT Pub. No.: WO2009/056926
PCT Pub. Date: May 7, 2009

(65) Prior Publication Data
US 2010/0121508 A1    May 13, 2010

(30) Foreign Application Priority Data

Oct. 31, 2007   (JP) ................... 2007-283623

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .. 701/22; 180/65.21; 180/65.28; 180/65.285; 180/68.1; 180/68.4; 903/902; 60/598; 60/599; 60/605.3; 60/611

(58) Field of Classification Search
USPC ................. 701/22; 180/65.21, 65.28, 65.285, 180/68.1, 68.4; 165/41, 42, 58; 123/41.31, 123/41.56; 903/902, 903, 905, 906, 952; 60/598, 599, 605.3, 611
See application file for complete search history.

(56) References Cited

U.S. PATENT DOCUMENTS

| 6,450,275 B1 | 9/2002 | Gabriel et al. |
| 6,508,233 B1 * | 1/2003 | Suhre et al. .............. 123/478 |

(Continued)

FOREIGN PATENT DOCUMENTS

| DE | 101 53 587 A1 | 5/2002 |
| JP | A-10-077856 | 3/1998 |

(Continued)

OTHER PUBLICATIONS

International Search Report and Written Opinion issued in international application No. PCT/IB2008/002596 on May 7, 2009.

(Continued)

*Primary Examiner* — Khoi Tran
*Assistant Examiner* — Jamie Figueroa
(74) *Attorney, Agent, or Firm* — Oliff & Berridge, PLC (57) ABSTRACT

A hybrid system control apparatus is provided in which an intercooler is disposed upstream of the motor cooling radiator in a flow path of the ambient air flowing in an engine compartment, and/or is disposed such that at least a portion of the intercooler and a portion of the motor cooling radiator contact each other. The hybrid system control apparatus includes a warm-up portion that increases temperature of the boost air by controlling a load of the engine in cold start of a hybrid system such that the boost pressure from the forced air induction device is equal to or higher than a target boost pressure.

15 Claims, 7 Drawing Sheets

U.S. PATENT DOCUMENTS

| | | | |
|---|---|---|---|
| 6,561,169 B2 * | 5/2003 | Sealy et al. | 123/563 |
| 7,100,584 B1 * | 9/2006 | Bruestle et al. | 123/563 |
| 2006/0211364 A1 | 9/2006 | Brotz et al. | |
| 2009/0195093 A1 * | 8/2009 | Bandai et al. | 310/54 |

FOREIGN PATENT DOCUMENTS

| | | |
|---|---|---|
| JP | A-10-227213 | 8/1998 |
| JP | A-10-266855 | 10/1998 |
| JP | A-11-313406 | 11/1999 |
| JP | A-2001-173444 | 6/2001 |
| JP | A-2002-276364 | 9/2002 |
| JP | A-2005-186879 | 7/2005 |
| JP | A-2006-144703 | 6/2006 |
| WO | WO 03/013894 A2 | 2/2003 |

OTHER PUBLICATIONS

Japanese Office Action issued in Japanese Patent Application No. 2007-283623 on Oct. 22, 2009 (with partial English-language translation).

* cited by examiner

FIG.7 ically, at the time of cold start of the hybrid system, it is sometimes difficult to warm up the electric motor system quickly. In other words, it is difficult to reduce the friction loss of the electric motor system quickly at the time of cold start, and the fuel economy may be deteriorated.

HYBRID SYSTEM CONTROL APPARATUS AND HYBRID SYSTEM CONTROL METHOD

BACKGROUND OF THE INVENTION

1. Field of the Invention

The present invention relates to a hybrid system control apparatus and a hybrid system control method.

2. Description of the Related Art

A hybrid system provided with an engine and an electric motor is known in which a hybrid vehicle is driven by a power produced by at least one of the engine and the electric motor. In the hybrid system, in addition to an engine system, an electric motor system, which is formed by, for example, an electric motor, a generator, an inverter, a transmission, or the like. Therefore, in the hybrid system, each of the systems may be provided with a cooling system that performs heat exchange with an exterior.

Further, if the engine in the hybrid system has a forced air induction device, an intercooler that cools boost air (intake air) from the forced air induction device is usually provided. The forced air induction device increases the temperature of the boost air to, for example, 200° C., by boosting the pressure (compression). If the engine inhales the high temperature boost air, charging efficiency (volumetric efficiency) is reduced. Therefore, the boost air is cooled by radiating heat of the boost air from the intercooler.

Japanese Patent Application Publication No. 2006-144703 (JP-A-2006-144703) describes a hybrid vehicle driven by at least one of an internal combustion engine having a forced air induction device and an intercooler, and an electric motor. The hybrid vehicle is provided with an internal combustion engine cooling system having an internal combustion engine radiator, and an inverter cooling system having an inverter radiator. In the hybrid vehicle described in JP-A-2006-144703, the inverter radiator, the intercooler and the internal combustion engine radiator are disposed in this order from the front of the vehicle.

Drive elements (for example, electric motor, generator, transmission, etc.) that form an electric motor are lubricated by lubricant. At the time of cold start of the hybrid system, the viscosity of lubricant in the electric motor system is high. Therefore, when the vehicle is driven by the power output from the electric motor, friction loss increases. Because the increase in the friction loss deteriorates fuel economy, the electric motor system must be warmed up quickly at the time of cool start.

However, in the hybrid vehicle described in JP-A-2006-144703, because the inverter radiator and the intercooler are disposed in this order from the front of the vehicle, the intercooler radiates heat of the boost air whose temperature is increased by the compression in the forced air induction device, and the ambient air heated by the heat radiation flows toward the rear side of the vehicle due to the traveling wind (wind flowing from the front to the rear of the vehicle while the vehicle is moving forward) without passing by the inverter radiator.

Accordingly, at the time of cold start of the hybrid system, it is sometimes difficult to warm up the electric motor system quickly. In other words, it is difficult to reduce the friction loss of the electric motor system quickly at the time of cold start, and the fuel economy may be deteriorated.

SUMMARY OF THE INVENTION

The present invention provides a hybrid system control apparatus that is provided with an electric motor and an engine having a forced air induction device and an intercooler, and that drives a hybrid vehicle by the power of at least one of the electric motor and the engine. The hybrid system control apparatus warms up an electric motor system quickly at the time of cold start. The present invention also provides a hybrid system control method.

A first aspect of the present invention provides a hybrid system control apparatus that drives a hybrid vehicle. The hybrid system control apparatus includes a motor system including an electric motor; a motor cooling radiator that performs heat exchange between ambient air and a motor cooling medium that cools the motor system; a forced air induction device that boosts the pressure of air supplied to an engine; an intercooler that cools the boost air. The intercooler is at least one of disposed upstream of the motor cooling radiator in a flow path of the ambient air flowing in an engine compartment, and disposed such that at least a portion of the intercooler and a portion of the motor cooling radiator contact each other. The hybrid system control apparatus further includes a warm-up portion that increases temperature of the boost air by controlling a load of the engine in cold start of a hybrid system such that the boost pressure from the forced air induction device is equal to or higher than a target boost pressure.

The electric motor system of the invention may include an electric motor and a driving element related to the electric motor, such as a generator, an inverter or a transmission.

As described above, during cold start of the hybrid system, the viscosity of lubricant that lubricates the driving elements forming the electric motor system is sometimes very high. Therefore, when the vehicle is driven by the power output by the electric motor, increase of friction loss may deteriorate fuel economy in cold start.

Therefore, in the hybrid system control apparatus according to the first aspect of the present invention, the temperature of the boost air is increased by controlling the engine load such that the boost pressure is equal to or higher than a preset target boost pressure in cold start. Then, the heat of the boost air radiated from the intercooler is effectively supplied to the cooling medium (hereinafter, sometimes referred to as "electric motor system cooling medium") circulating though the electric motor cooling system, thereby facilitating the warm-up of the electric motor system at the time of cold start.

The target boost pressure is a boost pressure at which it is considered that the temperature of the boost air (intake air) can be sufficiently increased. For example, the target boost pressure may be determined such that the temperature of the boost air flowing into the intercooler is increased to the temperature obtained by adding a predetermined margin to the temperature of cooling medium for the electric motor cooling system.

As described above, the boost air whose temperature is increased by increasing the boost pressure to the target boost pressure exchanges heat with the ambient air introduced in the engine compartment to heat the ambient air.

According to the first aspect of the invention, if the intercooler and the motor cooling radiator are disposed in this order from the upstream side in the flow path of the ambient air, the ambient air heated by the heat radiated from the intercooler passes by the motor cooling radiator, which is disposed downstream of the intercooler in the flow path of the ambient air. As a result, in the motor cooling radiator, heat exchange is performed between the cooling medium for the motor cooling system and ambient air, and the temperature of the electric motor system cooling medium thus increases. For example, when the ambient air introduced into the vehicle flows from the front side to the rear side of the vehicle, the intercooler and the electric motor cooling system radiator are arranged in this order from the front of the vehicle such that the intercooler and the electric motor cooling system radiator are arranged in this order from upstream side in the flow path of the ambient air.

On the other hand, when the intercooler and the electric motor cooling system radiator are disposed such that at least a portion of the intercooler and a portion of the motor cooling radiator contact each other, the heat of the boost air directly heats the electric motor system cooling medium. As described above, according to this aspect of the present invention, during cold start of the hybrid system, the temperature of the boost air is rapidly increased by controlling engine loads, and the exhaust heat recovery from the intercooler is effectively performed, thereby increasing the temperature of the electric motor system cooling medium rapidly. Accordingly, the warm-up of the electric motor system at the time of cold start is facilitated. As a result, the friction loss in the electric motor system at the time of cold start can be reduced rapidly, and fuel economy is improved.

Incidentally, the intercooler according to the present invention may be an air-cooling intercooler or a water-cooling intercooler. If the former is used, the ambient air passing by the intercooler is heated by the boost air flowing into the intercooler. If the latter is used, the coolant water circulating through the intercooler is heated by the boost air, and the heated coolant water heats the ambient air passing by the intercooler. Further, because the heat capacity of air is smaller than the heat capacity of water, air-cooling intercooler may be preferably used. By adopting the air-cooling intercooler, the heat of the boost air is more effectively supplied to the electric motor system cooling medium.

Further, in cold start of the hybrid system, the engine is usually cold. Furthermore, if an exhaust purifying catalyst is provided in the engine exhaust system, the temperature of the catalyst is also low. Therefore, from the viewpoint of exhaust emission, while the engine output power in cold start is maintained relatively low, the output power of the electric motor makes up the deficiency in the engine output power with respect to the required output power. The hybrid system control apparatus according to this aspect of the present invention may be used in the case where most of the vehicle drive power in cold start is output by the electric motor. In this case, the fuel economy is more significantly improved, as compared with the case in which the hybrid system control apparatus of this aspect of the present invention is not employed.

In the meantime, during cold start of the hybrid system, as the speed of the hybrid vehicle is higher (faster), the traveling wind becomes stronger (faster), and thus the flow volume of air passing by the intercooler increases. Here, because the temperature of the ambient air introduced into the vehicle in cold start is low, as the flow volume of the ambient air passing by the intercooler increases, it becomes more difficult to increase the temperature of the electric motor system cooling medium by the heat radiation from the intercooler. Accordingly, the warm-up portion may set the target boost pressure higher, as the vehicle speed of the hybrid vehicle becomes higher (faster).

Further, when the temperature of ambient air in cold start is low, the temperature of the intake air introduced into the intake passage of the engine is also low, and thus boost air temperature needs to be increased by a large amount. Furthermore, because the temperature of the ambient air passing by the intercooler is also low, the ambient air temperature also needs to be increased by a large amount. Accordingly, the warm-up portion may set the target boost pressure higher, as the temperature of the ambient air in cold start is lower.

Further, when the temperature of the electric motor system cooling medium in cold start is low, the heat radiation from the intercooler to be supplied to the electric motor system cooling medium must be increased. Accordingly, the warm-up portion may set the target boost pressure higher, as temperature of the cooling medium circulating through the motor cooling system in cold start is lower.

As described above, the target boost pressure is set finely in accordance with the vehicle speed of the hybrid vehicle, the ambient air temperature, and the temperature of the electric motor system cooling medium, and thus the engine load can be controlled accurately. Therefore, the warm-up of the electric motor system can be preformed efficiently.

A second aspect of the present invention provides a method for controlling a hybrid system of a hybrid vehicle. In the method, it is determined whether the hybrid system operates in cold start. If it is determined that the hybrid system operates in cold start, it is determined that a target temperature of a boost air from a forced air induction device that flows into an intercooler, such that the target temperature changes in accordance with one of a vehicle speed, temperature of ambient air and temperature of a motor cooling medium that cools a motor in the hybrid system. A target load of an engine in cold start is determined in accordance with the determined target temperature. A target fuel injection amount is then determined in accordance with the determined target load of the engine. A target motor output power is determined in accordance with the target load of the engine. A fuel injection amount is adjusted so as to meet the determined target fuel injection amount; and a motor output power is adjusted so as to meet the determined target motor output power.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention are described in detail with examples with reference to drawings. The scope of the invention is not limited to the dimensions, materials, shapes and relative arrangements, etc. described in the embodiments.

Figure 1:
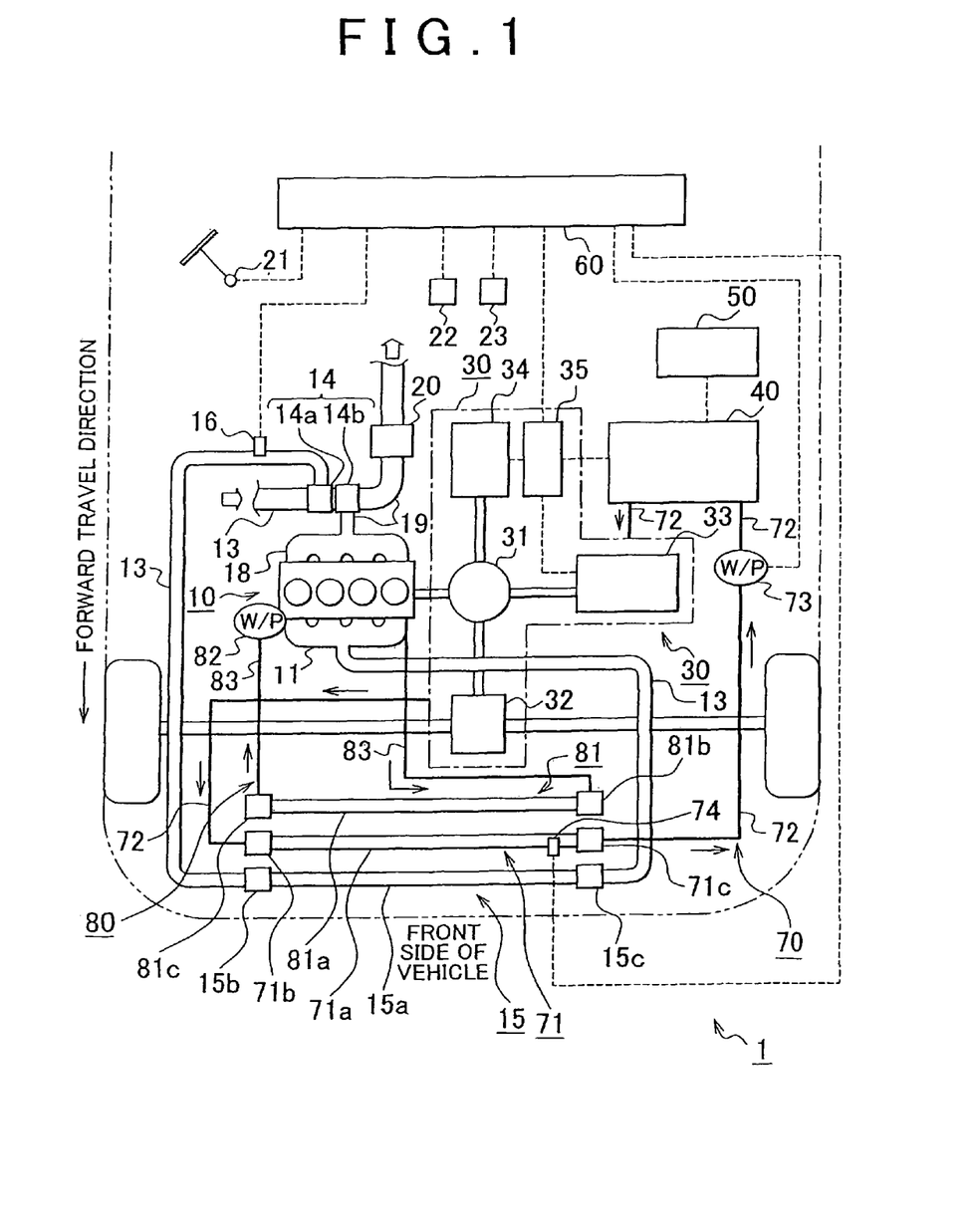
FIG. 1 is a diagram illustrating a schematic construction of a hybrid system according to a first embodiment of the present invention.

FIG. 1 is a diagram illustrating a schematic construction of a hybrid system 1 according to a first embodiment of the present invention. As shown in FIG. 1, the hybrid system 1 is provided with an engine 10, a transaxle 30, an inverter 40, a battery 50, and a hybrid control unit 60 (hereinafter, referred to as "HV_ECU (Electronic Control Unit)") that controls the entire hybrid system 1. In the drawings, a part of the outline (contour) of a hybrid vehicle is shown by a two-dot chain line.

The engine 10 generates a driving force (engine output power) of the hybrid vehicle from the fuel combustion energy as a source. The transaxle 30 is formed by a transmission and an axle integrated with each other. A power split device (for example, a planetary gear mechanism) 31, a reduction device 32, an electric motor 33, a generator 34, and a power control unit 35 (hereinafter, referred to as "MG_ECU") that controls the electric motor 33 and the generator 34 are accommodated in the interior of the transaxle 30. Further, lubricant is stored in the transaxle 30, and lubricates the electric motor 33, the generator 34, the power split device 31, reduction device 32, and the like. The electric motor system according to the first embodiment of the invention includes the transaxle 30 and the inverter 40.

The generator 34 generates electricity through the engine output power generated by the engine 10. The electric motor 33 generates a driving force (motor output power) of the hybrid vehicle through the electric power supplied by the battery 50 or the generator 34. The battery 50 is charged with the electric power to drive the electric motor 33. The engine output power and the motor output power are transmitted to the reduction device 32 through the power split device 31. Then, the reduction device 32 transmits the power to wheels to drive the hybrid vehicle.

The power split device 31 transmits the power between the engine 10 and the generator 34, between the engine 10 and the reduction device 32, and between the electric motor 33 and the reduction device 32. The inverter 40 converts between the direct current from the battery 50 and the alternate current from the generator 34, and controls the currents. In this embodiment, the inverter 40 includes a step up converter (not shown) that boosts electric power voltage.

Next, a schematic construction of the engine 10 and its intake and exhaust systems are explained. The engine 10 is connected to an intake manifold 11, and each branch pipe of the intake manifold 11 is communicated with the combustion chamber of each cylinder through an intake port. The intake manifold 11 is connected to an intake passage 13. The intake passage 13 is provided with a compressor housing 14a of a turbocharger 14 that operates with energy of exhaust gas as a driving source. Further, an air-cooling intercooler 15 that cools the gas flowing in the intake passage 13 is provided in the intake passage 13 downstream of the compressor housing 14a. Further, an intake air temperature sensor 16 is provided in the intake passage 13 between the compressor housing 14a and the intercooler 15. The intake air temperature sensor 16 outputs an electric signal corresponding to the temperature of boost air.

In the intake system of the engine 10 constructed as described above, the intake air flowing into the compressor housing 14a is compressed by the rotation of a compressor wheel (not shown) provided in the compressor housing 14a. Then, the boost air (intake air) whose temperature is caused to be high by the compression thereof is cooled in the intercooler 15 and then flows in the intake manifold 11. Then, the intake air flowing in the intake manifold 11 is distributed to each cylinder through an intake port. Then, the intake air distributed to each cylinder forms an air/fuel mixture with the fuel injected from a fuel injection valve (not shown), and is burned.

Further, the engine 10 is connected to an exhaust manifold 18, and each branch pipe of the exhaust manifold 18 is communicated with the combustion chamber of each cylinder through an exhaust port (not shown). The exhaust manifold 18 is connected to an exhaust passage 19. A turbine housing 14b of the turbocharger 14 is provided in the exhaust passage 19. Further, an exhaust purifying catalyst 20 (for example, a three-way catalyst) is provided in the exhaust passage 19 downstream of the turbine housing 14b. The exhaust passage 19 is connected to a muffler (not shown) at the downstream of the exhaust purifying catalyst 20.

In the exhaust system of the engine 10 constructed as described above, exhaust gas from each cylinder is discharged into the exhaust manifold 18 through the exhaust port, and then flows into the turbine housing 14b. The exhaust gas flowing into the turbine housing 14b rotates a turbine wheel (not shown) rotatably supported in the turbine housing 14b. At that time, the rotational torque of the turbine wheel (not shown) is transmitted to the compressor wheel (not shown) in the compressor housing 14a. Then, in the exhaust gas discharged from the turbine housing 14b is purified to remove harmful substances (for example, NOx, HC, CO and the like), and the purified exhaust gas is discharged to the open air through the muffler.

In this embodiment, the HV_ECU 60 controls the operation state of the engine 10. In addition, the HV_ECU 60 is connected to sensors, such as the intake air temperature sensor 16 or a crank position sensor (not shown) that detects an engine rotational speed, through electric wiring, and the output signals from the sensors are input to the HV_ECU 60. Further, the HV_ECU 60 is connected to a fuel injection valve (not shown) through electric wiring. The HV_ECU 60 controls a fuel injection amount supplied to the engine 10.

Further, the HV_ECU 60 is connected to an accelerator position sensor 21, a vehicle speed sensor 22 and an ambient air temperature sensor 23 through electric wiring. The accelerator position sensor 21 outputs an electric signal corresponding to a depression amount of an accelerator pedal (an accelerator angle Acc). The vehicle speed sensor 22 outputs an electric signal corresponding to a running speed of the hybrid vehicle. The ambient air temperature sensor 23 outputs an electric signal corresponding to an ambient temperature. The output signals of these sensors are input to the HV_ECU 60. The ambient temperature is a temperature of ambient air before heat exchange with a heat exchanger, such as an intercooler 15, is performed. Thus, the ambient temperature generally corresponds to the temperature of air before being introduced into the engine compartment of the hybrid vehicle.

In the hybrid system 1 according to this embodiment, HV_ECU 60 determines the driving force distribution between the engine 10 and the electric motor 33 based on the output power requested by a driver or based on driving conditions, more specifically, for example, the accelerator angle Acc or the state of charge (SOC) of the battery 50, and controls the engine output power and the motor output power. The hybrid system 1 is provided with a SOC sensor (not shown) that detects the SOC of the battery 50. The HV_ECU 60 regulates and controls the SOC of the battery 50.

Next, the cooling system of the hybrid system 1 according to this embodiment will be described. The intercooler 15 of the embodiment is formed by an intercooler core 15a and intercooler tanks 15b, 15c. The intercooler core 15a is formed by multiple intercooler tubes, each having hollow interior, and multiple undulating metal plates (hereinafter, referred to as "intercooler fins"), which are attached to the intercooler tubes.

Similar to the intercooler tubes, the intercooler tanks 15b, 15c are hollow. The boost air from the turbocharger 14 flows into the intercooler tank 15b, and then passes through the intercooler tubes of the intercooler core 15a. Then, when the boost air passes through the intercooler tubes, the heat in the boost air is transmitted to the intercooler fins through the intercooler tubes.

When the hybrid vehicle is running, the ambient air introduced into the engine compartment passes by the multiple intercooler fins. Due to this, heat is exchanged between the intercooler fins and the ambient air. Thus, the boost air is cooled. The cooled boost air flows into the intercooler tank 15c, passes through the intake passage 13, and is supplied to each cylinder of engine 10. Thus, the high temperature boost air is cooled by the intercooler 15, thereby suppressing or preventing the volumetric efficiency in the combustion chamber of the engine 10 from being decreased.

Further, the hybrid system 1 is provided with an electric motor cooling system 70 that cools the above-described electric motor system. The electric motor cooling system 70 includes an electric motor cooling system radiator 71, which is an heat exchanger, an electric motor system coolant passage 72, through which coolant water for the electric motor cooling system (hereinafter, referred to as "electric motor system coolant") is circulated, and an electric water pump 73. The electric motor system coolant in this embodiment may be regarded as the motor cooling medium circulating through the electric motor cooling system of the invention.

The electric motor cooling system radiator 71 of this embodiment is formed by a motor system core 71a and motor system tanks 71b, 71c. Further, the motor system core 71a is formed by multiple motor system tubes, each having hollow interior, and multiple undulating metal plates (hereinafter, referred to as "motor system fins") attached to the motor system tubes. Further, the electric motor cooling system radiator 71 is provided with a coolant temperature sensor 74 that detects the temperature of the electric motor system coolant (hereinafter, referred to as "electric motor system coolant temperature"). The coolant temperature sensor 74 is connected to the HV_ECU 60 through electric wiring, and an output value from the coolant temperature sensor 74 is input to the HV_ECU 60.

The electric motor system coolant passage 72 is communicated with the motor system tanks 71b, 71c of the electric motor cooling system radiator 71, and contacts components that form the inverter 40 and transaxle 30. More specifically, the electric motor system coolant passage 72 contacts either a housing of the inverter 40 or components therein, and contacts a housing of the transaxle 30 or the electric motor 33, generator 34, power split device 31, reduction device 32, and the like accommodated in the housing of the transaxle 30.

The electric water pump 73 is driven to circulate the electric motor system coolant through the electric motor system coolant passage 72. The electric water pump 73 is connected to the HV_ECU 60 through electric wiring, and is driven by the command signals from the HV_ECU 60.

According to the electric motor cooling system 70 as described above, the electric motor system coolant discharged by operating the electric water pump 73 sequentially flows through the inverter 40 and the transaxle 30. The electric motor system coolant flowing out from the transaxle 30 flows into the motor system tank 71b of the electric motor coolant system radiator 71, and then passes through the motor system tubes of the motor system core 71a. Then, when the electric motor system coolant passes through the motor system tubes, heat of the electric motor system coolant is transmitted to the motor system fins. Then, the heat is exchanged between the motor system fins and ambient air.

In other words, if the temperature of the ambient air passing by the motor system fins is lower than that of the motor system fins, the electric motor system coolant is cooled. On the other hand, if the ambient air temperature is higher than that of the motor system fins, the electric motor system coolant is heated.

Next, an engine cooling system 80 that cools the engine system 10 according to this embodiment is described. The engine 80 is formed by an engine cooling system radiator 81, a water pump 82, a water jacket (not shown) formed in a cylinder head, a cylinder block, or the like, of the engine 10, and an engine system coolant passage 83 that connects among them and through which coolant water for the engine cooling system (hereinafter referred to as "engine system coolant") is circulated.

The engine cooling system radiator 81 is formed by an engine system core 81 and engine system tanks 81b, 81c. Further, the engine system core 81a is formed by multiple engine system tubes, each having hollow interior, and multiple undulating metal plates (hereinafter, referred to as "engine system fins") attached to the engine system tubes. Further, the water pump 82 is driven by the torque from the crankshaft (not shown) of the engine 10.

In the engine cooling system 80 having the construction described above, the engine system coolant discharged by operating the water pump 82 flows in the water jacket, and receives the heat generated by the engine 10. Thus, heat is exchanged between the engine 10 and the engine system coolant. Then, the engine system coolant passes through the engine system coolant passage 83 and then flows in the engine cooling system radiator 81.

The engine system coolant flows in the engine system tank 81b of the engine cooling system radiator 81, and then passes through the engine system tubes of the engine system core 81a. Then, when the engine system coolant passes through the engine system tubes, the heat of the engine system coolant is transmitted to the engine system fins. Thus, heat exchange is performed between the engine system fins and ambient air. In other words, if the temperature of the ambient air passing by the engine system fins is lower than that of the engine system fins, the engine system coolant is cooled. On the other hand, if the ambient air temperature is higher than that of the engine system fins, the engine system coolant is heated.

In this embodiment, the intercooler 15, the electric motor cooling system radiator 71, the engine cooling system radiator 81 (hereinafter, these may be generally referred to as "heat exchangers") are arranged from the front of the hybrid vehicle in this order. Here, the ambient air introduced into the engine compartment from the outside of the hybrid vehicle flows from the front to the rear of vehicle. In other words, therefore, the intercooler 15, the electric motor cooling system radiator 71 and the engine cooling system radiator 81 are arranged in this order from the upstream side to the downstream side of the ambient air flow path.

Next, control of the hybrid system 1 of the embodiment in cold start will be described. At the time of cold start of the hybrid system 1, the temperature of the engine 10 or the exhaust purifying catalyst 20 is low. Therefore, when the engine output power is increased at the time of cold start, the emission may be deteriorated (i.e., increased) due to the deterioration of the combustion state and the reduction in efficiency of the exhaust purification. Accordingly, in the hybrid system 1 according to the embodiment, the vehicle driving force in cold start is mainly supplied by the motor power output by the electric motor 33, and the engine output power is kept relatively low until the engine warm-up is completed. Thus, exhaust emission at the time of cold start is reduced.

However, in cold start, as described above, the viscosity of the lubricant that lubricates electric motor system is very high. Accordingly, if the electric motor 33 mainly outputs the vehicle driving force at the time of cold start, friction loss significantly increases and fuel economy is degraded. Therefore, in this embodiment, a warm-up facilitating control is performed that facilitates warm-up of the motor system at the time of cold start of the hybrid system 1.

In the warm-up facilitating control according to the embodiment, the engine load TQe is controlled to be high at the time of cold start of the hybrid system 1. More specifically, in the warm-up facilitating control, the engine load TQe is controlled to be a cold start target load TQet at which the boost pressure of the turbocharger 14 is maintained higher than the target boost pressure Cit. The target boost pressure Cit is a boost pressure that increases the temperature of the boost air flowing into the intercooler 15 to a target temperature THat. The target boost pressure Cit is experimentally obtained in advance. The target temperature THat of the boost air is a target value of the temperature of the boost air flowing in the intercooler 15, and is set higher than the electric motor system coolant temperature THw.

In this embodiment, the engine load TQe is controlled to be a cold start target load TQet as described above to increase the temperature of the boost air to the target temperature THat. Then, the heat of the boost air is radiated from the intercooler 15. Then, the heat of the boost air is preferentially supplied to the electric motor system coolant to facilitate the warm-up of the electric motor system.

Figure 2:
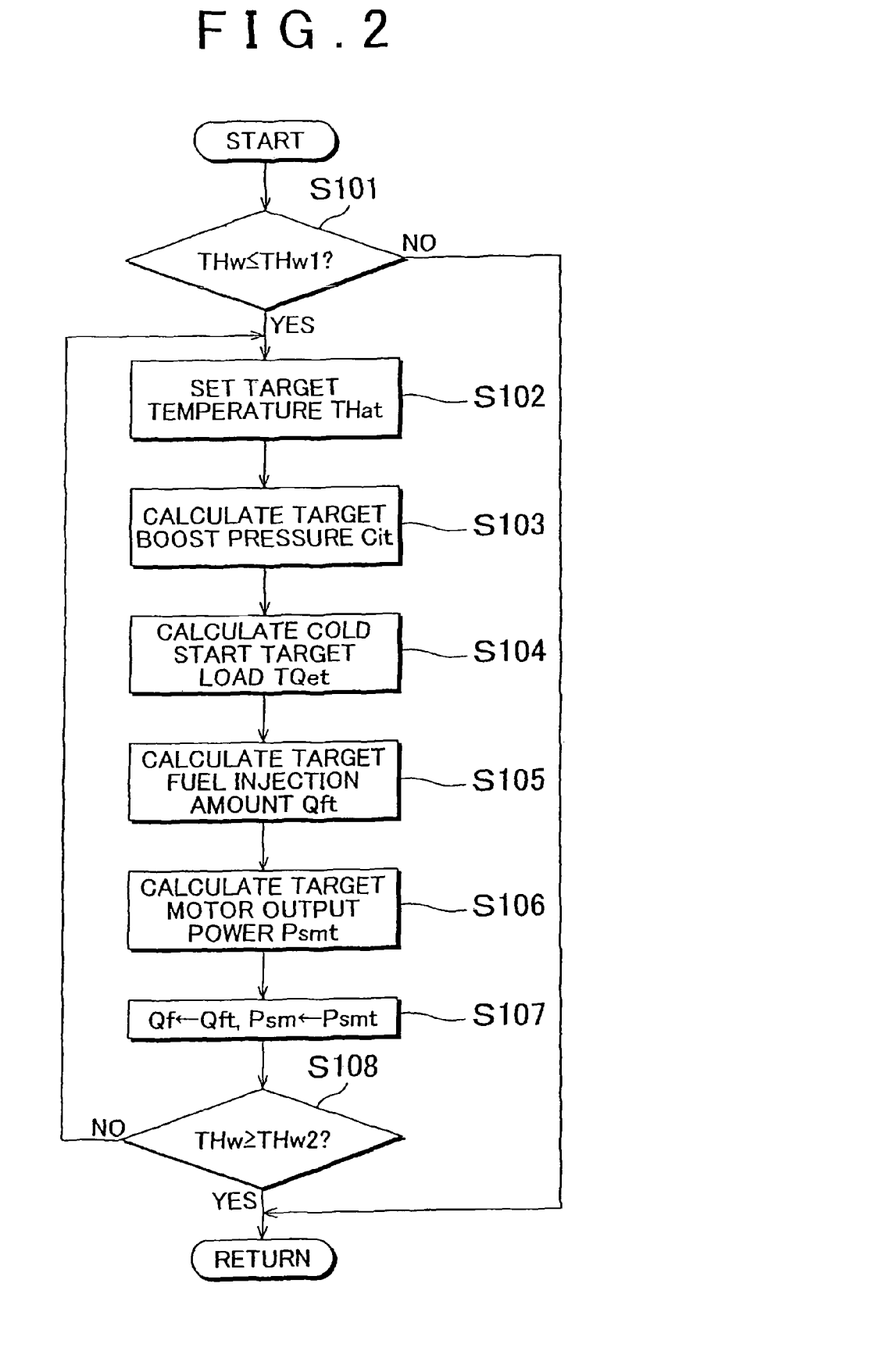
FIG. 2 is a flowchart illustrating a warm-up facilitating control routine according to the first embodiment.

The warm-up facilitating control performed by the HV_ECU 60 will be described below with reference to FIG. 2. FIG. 2 is a flowchart showing a warm-up facilitating control routine according to the embodiment. This routine is a program stored in a ROM of the HV_ECU 60, and is performed every start of the hybrid system 1. The HV_ECU 60 that performs this routine in this embodiment may be regarded as a warm-up portion of the invention.

After this routine is started, in step S101, HV_ECU 60 detects the electric motor system coolant temperature THw based on the value output by the coolant temperature sensor 74, and determines whether the detected electric motor system coolant temperature THw is equal to or lower than a first reference coolant temperature THw1. Thus, in this step, it is determined whether the warm-up facilitating control must be performed at the start of the operation of the hybrid system 1. In other words, it is determined whether the hybrid system 1 is in cold start or not. The first reference coolant temperature THw1 is a temperature to determine that the viscosity of lubricant is excessively high due to the low electric motor system coolant temperature, and is experimentally set in advance. If the determination in this step is affirmative (THw≦THw1), the control proceeds to step S102. If the determination in this step is negative (THw>THw1), this routine is terminated.

In step S102, the target temperature THat to increase the temperature of the boost air is set. The target temperature THat is set by adding a predetermined value to the electric motor system coolant temperature THw detected in step S101. In step S103, the temperature of the boost air is detected based on the value output by the intake air temperature sensor 16, and the target boost pressure Cit is calculated based on the detected temperature of the boost air and the target temperature THat.

In step S104, the cold start target load TQet is calculated based on the target boost pressure Cit. In this embodiment, the relationship between the target boost pressure Cit and the cold start target load TQet is experimentally obtained in advance, and a map indicating the relationship is stored in the ROM of the HV_ECU 60. Then, the cold start target load TQet is obtained using the calculated target boost pressure Cit and the map (i.e., by assigning the calculated target boost pressure Cit to the map).

In step S105, the target fuel injection amount Qft supplied to engine 10 is calculated in accordance with the cold start target load Qet.

In step S106, a motor output power Psm to be output by the electric motor 33 is calculated. In other words, in this step, a requested output power Psa is detected based on the value (accelerator angle Acc) output by the accelerator position sensor 21. Then, a target motor output power Psmt is calculated. The Psmt is a target value of the motor output power and indicates a deficiency in the engine output power Pse with respect to the requested output power Psa when the engine load TQe is controlled to be the cold start target load TQet. In this embodiment, the engine output power Pse is controlled to be relatively low to reduce the exhaust emission in cold start. Accordingly, the rotational speed of the generator 34 and the engine load TQe are so adjusted to control the rotational speed in cold start to be in a low rotation region.

In step S107, the fuel injection amount Qf of the engine 10 is adjusted to meet the target fuel injection amount Qft calculated in the step S105. Further, the motor output power Psm is adjusted to meet the target value Psmt calculated in step S106.

In step S108, the electric motor system coolant temperature THw is detected based on the value output by the coolant temperature sensor 74, and it is determined whether the detected electric motor system coolant temperature THw is equal to or higher than a second reference coolant temperature THw2. Thus, it is determined in this step whether the warm-up facilitating control can be terminated. The second reference coolant temperature THw2 is a temperature to determine that the electric motor system coolant temperature is increased and the viscosity of lubricant becomes sufficiently low. The second reference coolant temperature THw2 is set higher than the first reference coolant temperature THw1.

If the determination in this step is negative (THw<THw2), the control process returns to the step S102 and the warm-up facilitating control continues. In this case, the target temperature THat of the boost air is set again in step S102. In other words, the target temperature THat of the boost air is set by adding a predetermined value to the electric motor system coolant temperature THw detected in step S108. If the determination in step S108 is affirmative (THw≧THw2), this routine is terminated.

As described above, according to this embodiment, the warm-up facilitating control is performed in cold start of the hybrid system 1. Therefore, the boost air whose temperature is increased to the target temperature THat flows in the intercooler 15, and the heat of the boost air is transmitted to the intercooler fins via the intercooler tubes. Hereinafter, the flow of the ambient air introduced into the engine compartment of the hybrid vehicle and the flow of heat will be described with reference to FIG. 1. The heat of the boost air whose temperature is increased due to the pressure boost (compression) by the turbocharger 14 is transmitted to the intercooler fins via the intercooler tubes.

The intercooler 15 is located at the most front of the vehicle among the heat exchangers. In other words, the intercooler 15 is located the most upstream in the flow path of the ambient air introduced into the engine compartment. Thus, the ambient air introduced into the engine compartment first performs the heat exchange with the boost air in the intercooler 15. As a result, the ambient air is heated.

Further, the electric motor cooling system radiator 71 is disposed next to the intercooler 15 and on the rear side of the intercooler 15 in the longitudinal direction of the vehicle. In other words, the electric motor cooling system radiator 71 is located downstream of the intercooler 15 in the flow path of ambient air. Therefore, when the ambient air, heated when passing by the intercooler 15, passes by the electric motor cooling radiator 71, the heat of the ambient air is transmitted to the motor system fins of the motor system core 71a. Accordingly, the electric motor system coolant in the motor system tubes is heated.

In this embodiment, the electric water pump 73 is driven by the command from the HV_ECU 60, and the heated electric motor system coolant is circulated through the electric motor system coolant passage 72. As a result, warm-up of the electric motor system, such as the inverter 40, the transaxle 30, or the like, is facilitated.

Next, the heat exchange between the ambient air, cooled by the heat exchange with the electric motor cooling system radiator 71, and the engine cooling system radiator 81 is described. The engine cooling system radiator 81 is located at the most rear side of the vehicle among the heat exchangers. In other words, because the engine cooling system radiator 81 is located at the most downstream side of the ambient air flow path, the ambient air that has been cooled by the electric motor cooling system radiator 71 passes by the engine cooling system radiator 81.

In the warm-up facilitating control according to the embodiment, the engine output power Pse is controlled at the low output power side. Further, the amount of the engine system coolant is larger than the amount of the electric motor system coolant. Accordingly, the temperature of the ambient air that is cooled by the electric motor cooling system radiator 71 and then passes by the engine cooling system radiator 81 is maintained higher than the temperature of the engine system coolant.

Therefore, when the ambient air passes by the engine cooling system radiator 81, the heat of the ambient air is transmitted to the engine system fins. Thus, the engine system coolant in the engine system tubes is heated. The engine system coolant thus heated is circulated through the engine system coolant passage 83 by the operation of the water pump 82, and the warm-up of the engine 10 is facilitated.

As described above, according to the embodiment, because the intercooler 15 and the electric motor cooling system radiator 71 are arranged in this order from the upstream side of the ambient air flow path, the sufficient heat quantity to be supplied to the electric motor system is secured. In other words, because the electric motor system is preferentially warmed up, the friction loss in the electric motor system is reduced quickly, and the fuel economy is improved.

Further, because, as compared with the electric motor system coolant, the temperature of the engine system coolant required to increase the temperature of ambient air is lower the engine cooling system radiator 81 is disposed at the rear side of the electric motor cooling system radiator 71. By doing this, because the warm-up of the engine 10 is performed concurrently with the warm-up of the electric motor system, exhaust heat is recovered from the intercooler 15 without waste. In addition, because, in this control, the engine load TQe is controlled to meet the cold start target load TQet in high load side, the temperature of exhaust from the engine 10 increases and the exhaust purification catalyst 20 is warmed up quickly.

Figure 3:
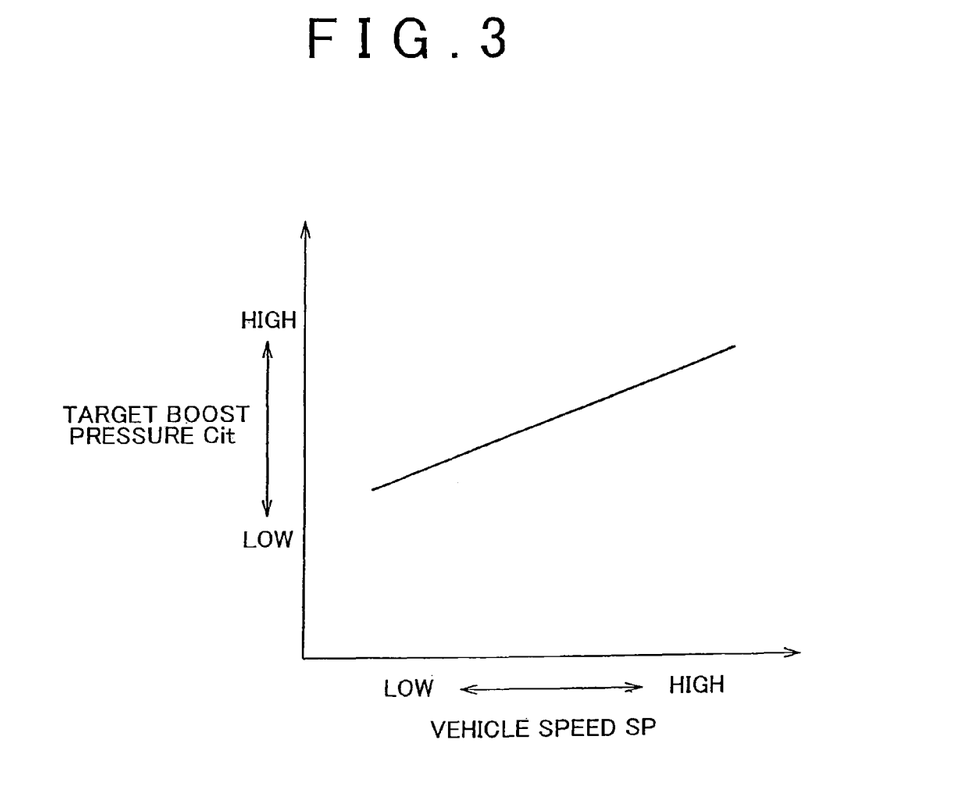
FIG. 3 is a diagram illustrating a relationship between target boost pressure Cit and vehicle speed SP.

Hereinafter, the method to set the target boost pressure Cit that fits more into the running state or running condition of the hybrid vehicle when the warm-up facilitating control is performed is described with reference to FIGS. 3 to 5. FIG. 3 is a diagram illustrating a relationship between the target boost pressure Cit and the vehicle speed SP. When the vehicle speed SP is high, traveling wind becomes stronger or faster. Therefore, the flow volume of the ambient air passing by the intercooler 15 increases. In cold start, the temperature of the ambient air introduced into the engine compartment is low. Therefore, as the flow volume of the ambient air passing by the intercooler 15 is higher, it is more difficult to increase the temperature of the electric motor system coolant by the heat radiated from the intercooler 15. Therefore, in this embodiment, the vehicle speed SP during the warm-up facilitating control is detected based on the value output by the vehicle speed sensor 22, and the target boost pressure Cit is set higher as the vehicle speed SP becomes higher.

Figure 4:
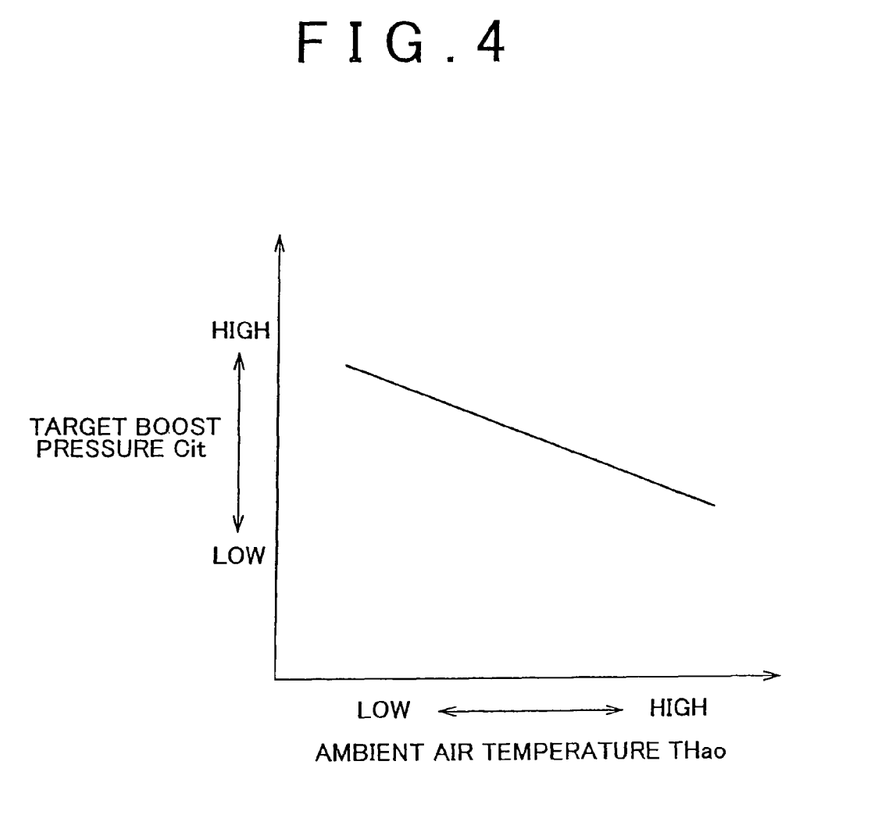
FIG. 4 is a diagram illustrating a relationship between target boost pressure Cit and ambient air temperature THao.
Figure 5:
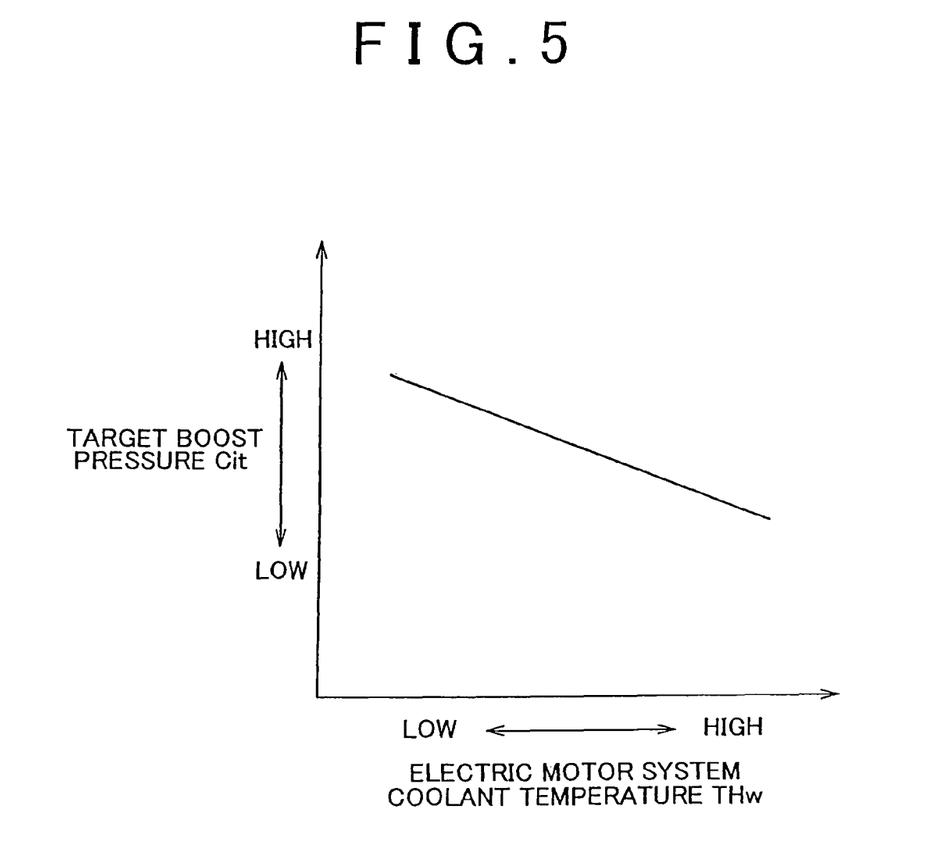
FIG. 5 is a diagram illustrating a relationship between target boost pressure Cit and motor cooling system coolant temperature THw.

FIG. 4 is a diagram illustrating a relationship between the target boost pressure Cit and the ambient air temperature THao. This ambient air temperature THao is the temperature of ambient air before the heat is exchanged with the intercooler 15. Further, FIG. 5 is a diagram illustrating a relationship between the target boost pressure Cit and the electric motor system coolant temperature THw.

When the ambient air temperature THao is low, the temperature of the intake air flowing through the intake passage 13 of the engine 10 is also low. Thus, the boost air temperature needs to be increased by a large amount. Further, because the temperature of the ambient air passing by the intercooler 15 is also low, the ambient air temperature also needs to be increased by a large amount. Furthermore, when the electric motor system coolant temperature THw is low, it is necessary to increase the amount of heat radiated from the intercooler 15 and supplied to the electric motor system coolant.

Accordingly, in the embodiment, the ambient air temperature THao and the electric motor system coolant temperature THw when the warm-up facilitating control is performed are detected based on values output by the ambient air temperature sensor 23 and the coolant temperature sensor 74. Then, as the ambient air temperature THao becomes lower, or as the electric motor system coolant temperature THw becomes lower, the target boost pressure Cit is set higher. As a result, the target boost pressure Cit can be set finely in accordance with the vehicle speed SP of the hybrid vehicle, the ambient air temperature THao, and the electric motor system coolant temperature THw.

Incidentally, the hybrid system 1 according to the embodiment may be provided with an electric fan that directs ambient air to the intercooler 15, the electric motor cooling system radiator 71, and the engine cooling system radiator 81. Then, when the vehicle is not moving or the vehicle speed is extremely low during the warm-up facilitating control, ambient air efficiently passes by the intercooler 15, the electric motor cooling system radiator 71 and the engine cooling system radiator 81 by operating the fan.

Accordingly to the embodiment, the intercooler 15, the electric motor cooling system radiator 71, the engine cooling system radiator 81 must be arranged in this order from the upstream side in the flow path of the ambient air, while it is not always necessary to arrange the intercooler 15, the electric motor cooling system radiator 71 and the engine cooling system radiator 81 in this order from the front side of the vehicle. As a result, design flexibility is appropriately secured in the flow path of the ambient air introduced to the intercooler 15 and various types of radiators.

Figure 6:
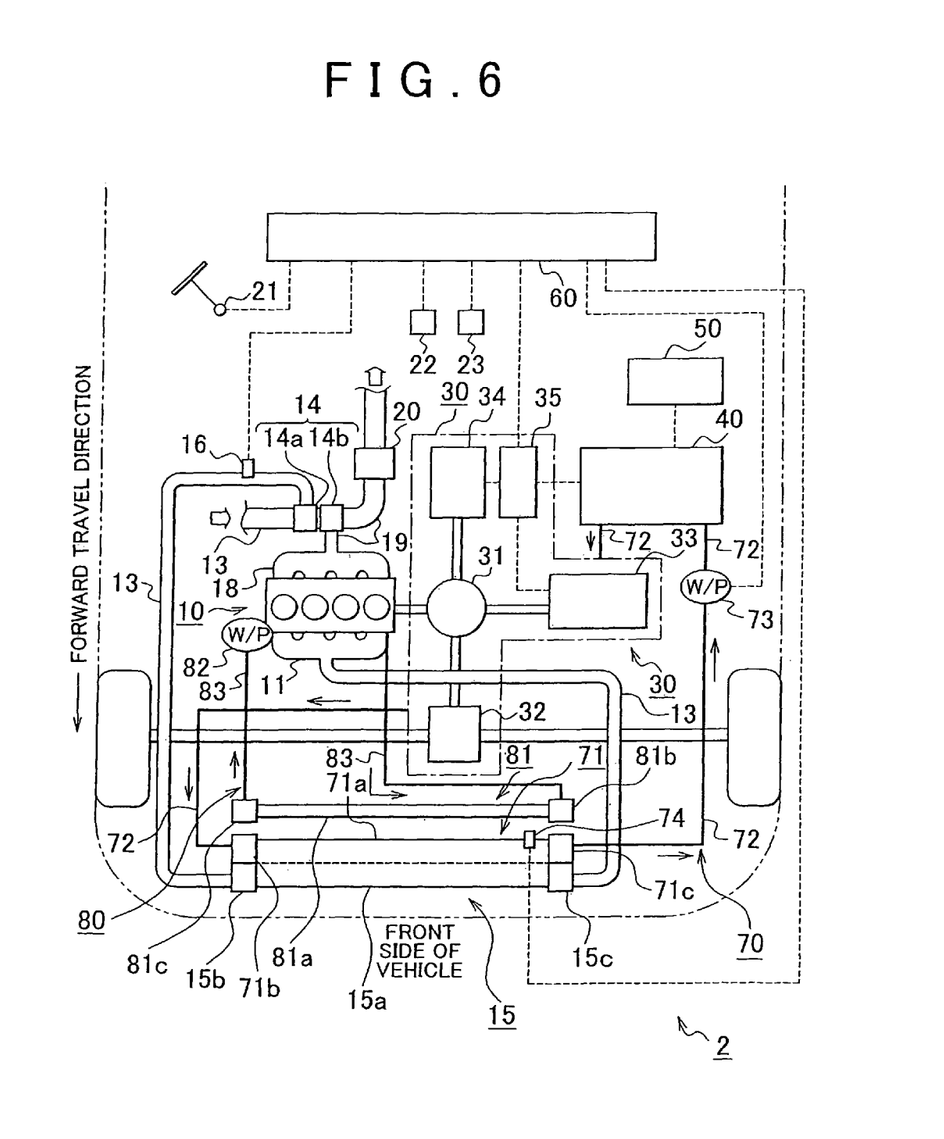
FIG. 6 is a diagram illustrating a schematic construction of a hybrid system according to a second embodiment of the present invention.

Next, a second embodiment, which is different from the first, embodiment, will be described with reference to FIG. 6. FIG. 6 is a diagram illustrating a schematic construction of a hybrid system 2 according to the second embodiment. In the following description, components that are the same as or equivalent to those of the hybrid system 1 shown in FIG. 1 are denoted by the same reference numerals, and detailed description thereof will be omitted. The difference between the hybrid system 2 and the hybrid system 1 shown in FIG. 1 is that the intercooler 15 and the electric motor cooling system radiator 71 are formed integrally. In other words, the intercooler 15 and the electric motor cooling system radiator 71 are disposed to contact each other. Further, in the second embodiment, the intercooler 15 and the electric motor cooling system radiator 71 have a heat exchange structure that enables direct mutual heat exchange therebetween.

In more detail, the intercooler tube of the intercooler core 15a and the motor system tube of the motor system core 71 are mutually connected, and heat is directly exchanged between the intercooler tube and the motor system tube. Further, the intercooler tanks 15b, 15c and the motor system tanks 71b, 71c are mutually connected, and thus have a heat exchange structure.

According to the above-described construction, the heat of the boost air flowing through the intercooler tube is transmitted to the electric motor system coolant via the motor system tube without the assistance of ambient air. Thus, even if the hybrid vehicle is not moving or there is very little traveling wind, the temperature of the electric motor system coolant can be increased. As a result, the warm-up of the electric motor system is appropriately facilitated.

Further, because the intercooler 15 and the electric motor cooling system radiator 71 are formed integrally, the space in the engine room occupied thereby is reduced. Further, the ambient air introduced into the engine compartment flows smoothly. Therefore, heat is exchanged efficiently between the heat exchanger, such as the intercooler 15, the electric motor cooling system radiator 71 or the engine cooling system radiator 81, and the ambient air. For example, cooling efficiency of the intercooler 15 to cool the boost air is improved, thereby improving the charging efficiency (volumetric efficiency) of the intake air in the engine 10.

Furthermore, because the intercooler 15 and the electric motor cooling system radiator 71 are formed integrally, the materials to form them can be the same or in common, and the cost is reduced. Further, because the size of the intercooler 15 and the size of the electric motor cooling system radiator 71 are reduced, the size of the engine cooling system radiator 81 can be increased. By doing this, because the cooling capacity of the engine cooling system radiator 81 increases, it is suitable when the engine 10 is cooled down after the warm-up of the system of engine 10 is completed.

Further, after the electric motor system is sufficiently warmed up, the difference between the target temperature of the electric motor system coolant and the target temperature of the boost air to be cooled by the intercooler 15 is relatively small in the normal control of the hybrid system 2. Therefore, heat transfer from the intercooler tube does not excessively increase the electric motor system coolant temperature.

Figure 7:
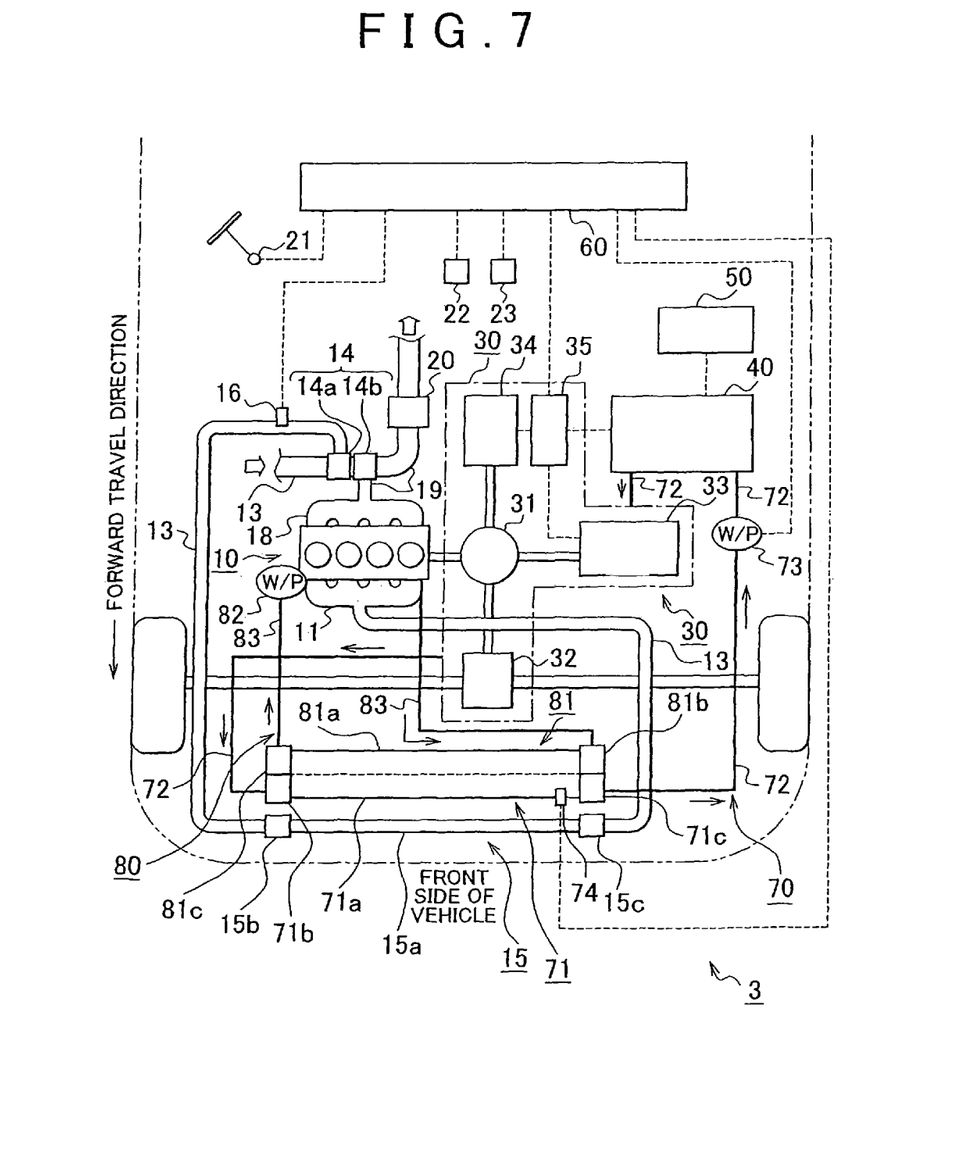
FIG. 7 is a diagram illustrating a schematic construction of a hybrid system according to a third embodiment of the present invention.

Next, a third embodiment, which is different from the first embodiment and the second embodiment, will be described with reference to FIG. 7. FIG. 7 is a diagram illustrating a schematic construction of the hybrid system 3 according to the third embodiment. In the following description, components that are the same as or equivalent to those of the hybrid system 1 shown in FIG. 1 are denoted by the same reference numerals, and detailed description thereof will be omitted.

The difference between the hybrid system 3 and the hybrid system 1 shown in FIG. 1 is that the electric motor cooling system radiator 71 and the engine cooling system radiator 81 are formed integrally. In other words, the electric motor cooling system radiator 71 and the engine cooling system radiator 81 are disposed to contact each other. Further, in the third embodiment, the electric motor cooling system radiator 71 and the engine cooling system radiator 81 have a heat exchange structure that enables direct mutual heat exchange therebetween.

In more detail, the motor system tube of the motor system core 71 and the engine system tube of the engine system core 81 are mutually connected, and heat is directly exchanged between the motor system tube and the engine system tube. Further, the motor system tanks 71b, 71c and the engine system tanks 81c, 81b are mutually connected, and have the heat exchange structure. According to the construction described above, after the electric motor system is preferentially warmed up, the heat of the electric motor system coolant can directly increase the temperature of the engine system coolant.

Further, according to the hybrid system 3, similar to the hybrid system 2 of the second embodiment, the ambient air introduced into the engine compartment flows smoothly. Therefore, the intercooler 15, the electric motor cooling system radiator 71 and the engine cooling system radiator 81 efficiently exchange heat with the ambient air. For example, the cooling efficient of the intercooler 15 to cool the boost air is further improved. In addition, because the electric motor cooling system radiator 71 and the engine cooling system radiator 81 are formed integrally, the materials to form them can be the same or in common, and the cost is reduced.

In the first to third embodiments described above, the intercooler 15 is disposed at the most front of the hybrid vehicle; however, the invention is not limited thereto. For example, an air conditioning condenser of an air conditioner that controls the passenger compartment temperature of the hybrid vehicle may be disposed further front side of the hybrid vehicle than the intercooler 15. By doing this, the heat radiated from the air conditioning condenser can be recovered in cold start of the hybrid system.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A hybrid system control apparatus that drives a hybrid vehicle, comprising:
   a motor system including an electric motor;
   a motor cooling radiator that performs heat exchange between ambient air and a motor cooling medium that cools the motor system;
   a forced air induction device that boosts the pressure of air supplied to an engine;
   an intercooler that cools the boost air, wherein the intercooler is at least one of disposed upstream of the motor cooling radiator in a flow path of the ambient air flowing in an engine compartment, and disposed such that at least a portion of the intercooler and a portion of the motor cooling radiator contact each other; and
   a warm-up portion that increases temperature of the boost air by controlling a load of the engine in cold start of a hybrid system, such that the boost pressure from the forced air induction device is equal to or higher than a target boost pressure, wherein the warm-up portion sets the target boost pressure higher, as temperature of the motor cooling medium in cold start becomes lower, wherein the target boost pressure is a boost pressure that increases the temperature of the boost air flowing into the intercooler to a temperature higher than electric motor system coolant temperature.

2. The hybrid system control apparatus according to claim 1, wherein the warm-up portion sets the target boost pressure higher, as a vehicle speed of the hybrid vehicle in cold start becomes higher.

3. The hybrid system control apparatus according to claim 1, wherein the warm-up portion sets the target boost pressure higher, as temperature of the ambient air in cold start becomes lower.

4. The hybrid system control apparatus according to claim 1, wherein the intercooler is an air-cooling type.

5. The hybrid system control apparatus according to claim 1, further comprising an engine cooling radiator that performs heat exchange between the ambient air and an engine cooling medium that cools the engine, wherein the engine cooling radiator is disposed downstream of the motor cooling radiator in the flow path of the ambient air flowing in the engine compartment.

6. The hybrid system control apparatus according to claim 1, further comprising an engine cooling radiator that performs heat exchange between the ambient air and an engine cooling medium that cools the engine, wherein the engine cooling radiator is disposed such that at least a portion of the motor cooling radiator and a portion of the engine cooling radiator contact each other.

7. The hybrid system control apparatus according to claim 1, further comprising a temperature sensor that detects temperature of the motor cooling medium, wherein the warm-up portion determines whether the hybrid system operates in cold start based on the detected temperature of the motor cooling medium.

8. The hybrid system control apparatus according to claim 1, wherein the intercooler and the motor cooling radiator are disposed in this order from the front of the vehicle.

9. The hybrid system control apparatus according to claim 5, wherein the intercooler, the motor cooling radiator and the engine cooling radiator are disposed in this order from the front of the vehicle.

10. A hybrid system control apparatus that drives a hybrid vehicle comprising:
a motor system including an electric motor; a motor cooling radiator that performs heat exchange between ambient air and a motor cooling medium that cools the motor system;
a forced air induction device that boosts the pressure of air supplied to an engine;
an intercooler that cools the boost air, wherein the intercooler is disposed upstream of the motor cooling radiator in a flow path of the ambient air flowing in an engine compartment;
a warm-up portion that increases temperature of the boost air by controlling a load of the engine in cold start of a hybrid system, such that the boost pressure from the forced air induction device is equal to or higher than a target boost pressure;
a vehicle speed sensor that detects vehicle speed of the hybrid vehicle; an ambient air temperature sensor that detects temperature of the ambient air; and
a cooling medium temperature sensor that detects temperature of the motor cooling medium,
wherein the warm-up portion determines the target boost pressure in accordance with one of the detected vehicle speed, the detected temperature of the ambient air and the detected temperature of the motor cooling medium, and determines a target load of the engine in accordance with the determined target boost pressure.

11. The hybrid system control apparatus according to claim 10, wherein the warm-up portion determines a target fuel injection amount in accordance with the determined target load and adjusts a fuel injection amount so as to meet the determined target fuel injection amount.

12. The hybrid system control apparatus according to claim 11, further comprising an accelerator position sensor that detects an accelerator angle, wherein the warm-up portion determines a required power of the hybrid vehicle based on the detected accelerator angle, further determines a target motor output power based on the determined required power of the hybrid vehicle and the target load, and adjusts a motor output power so as to meet the determined target motor output power.

13. The hybrid system control apparatus according to claim 1, further comprising an electric fan that directs the ambient air to the intercooler and the motor cooling radiator.

14. The hybrid system control apparatus according to claim 6, wherein the intercooler, the motor cooling radiator and the engine cooling radiator are disposed in this order from the front of the vehicle.

15. A hybrid system control apparatus that drives a hybrid vehicle, comprising:
a motor system including an electric motor;
a motor cooling radiator that performs heat exchange between ambient air and a motor cooling medium that cools the motor system;
a forced air induction device that boosts the pressure of air supplied to an engine;
an intercooler that cools the boost air, wherein the intercooler is at least one of disposed upstream of the motor cooling radiator in a flow path of the ambient air flowing in an engine compartment, and disposed such that at least a portion of the intercooler and a portion of the motor cooling radiator contact each other; and
a warm-up portion that controls a boost pressure of the boost air by controlling a load of the engine in cold start of a hybrid system and increases the temperature of the boost air flowing in the intercooler to a temperature higher than electric motor system coolant temperature.

* * * * *